(12) United States Patent
Akcayoz et al.

(10) Patent No.: US 12,553,450 B2
(45) Date of Patent: Feb. 17, 2026

(54) PLENUM CLOSURE PANEL WITH INTEGRATED AIRFLOW DIRECTION DEVICE

(71) Applicant: Pratt & Whitney Canada Corp., Longueuil (CA)

(72) Inventors: Eray Akcayoz, Cote-Saint-Luc (CA); Mohammed Ennacer, Longueuil (CA); Mark Cunningham, Montreal-Ouest (CA); David Denis, Burlington (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/672,161

(22) Filed: May 23, 2024

(65) Prior Publication Data

US 2025/0361876 A1  Nov. 27, 2025

(51) Int. Cl.
*F04D 29/46* (2006.01)
*F04D 29/42* (2006.01)

(52) U.S. Cl.
CPC ....... *F04D 29/464* (2013.01); *F04D 29/4213* (2013.01); *F05D 2250/51* (2013.01)

(58) Field of Classification Search
CPC . F04D 29/464; F04D 29/4213; F05D 2250/51
See application file for complete search history.

(56) References Cited

U.S. PATENT DOCUMENTS

| | | | | |
|---|---|---|---|---|
| 3,421,446 A | * | 1/1969 | Strscheletzly | F04D 29/4273 415/208.1 |
| 3,859,008 A | * | 1/1975 | Wieser | F04D 7/08 976/DIG. 200 |
| 4,844,695 A | | 7/1989 | Banks et al. | |
| 6,959,552 B2 | * | 11/2005 | Leblanc | F02C 7/055 137/15.1 |
| 7,625,173 B2 | * | 12/2009 | Mehring | F04D 29/541 55/306 |
| 9,217,369 B2 | * | 12/2015 | Rodriguez | F02C 7/04 |
| 10,415,502 B2 | * | 9/2019 | Bouldin | F02C 7/36 |
| 11,319,897 B2 | * | 5/2022 | Joo | F02K 1/40 |
| 11,808,207 B1 | | 11/2023 | Akcayoz | |
| 2002/0131862 A1 | * | 9/2002 | Sheoran | F15D 1/04 415/208.1 |
| 2005/0254941 A1 | * | 11/2005 | Inoue | F04D 29/4273 415/182.1 |

(Continued)

FOREIGN PATENT DOCUMENTS

| | | | | |
|---|---|---|---|---|
| EP | 2975270 A1 | * | 1/2016 | ......... F04D 29/4226 |
| EP | 3051099 B1 | | 11/2017 | |

(Continued)

*Primary Examiner* — Nathaniel E Wiehe
*Assistant Examiner* — Wayne A Lambert
(74) *Attorney, Agent, or Firm* — Bachman & LaPointe, P.C.

(57) ABSTRACT

A plenum assembly for a compressor has a plenum housing defining a radially inward entry to a compressor and an outer circumference, and at least two open areas in the outer circumferences which are defined by at least two plenum flanges; an inlet duct connected to a first plenum flange of the at least two plenum flanges; and a panel having a flow control feature, wherein the panel is connected to a second plenum flange of the at least two plenum flanges.

15 Claims, 4 Drawing Sheets

(56) References Cited

U.S. PATENT DOCUMENTS

| | | | | |
|---|---|---|---|---|
| 2010/0172753 A1* | 7/2010 | Lin | ................... | F04D 29/441 |
| | | | | 415/208.1 |
| 2011/0200421 A1* | 8/2011 | Gallier | ................... | F01D 25/30 |
| | | | | 415/211.2 |
| 2015/0056069 A1* | 2/2015 | Masutani | ............... | F04D 17/12 |
| | | | | 415/184 |
| 2015/0204280 A1* | 7/2015 | Ising | .................... | F16L 9/00 |
| | | | | 60/320 |
| 2016/0177872 A1* | 6/2016 | Akcayoz | ................ | F02K 1/40 |
| | | | | 239/265.11 |
| 2017/0241342 A1* | 8/2017 | Gekht | .................... | F02C 7/042 |
| 2017/0370377 A1* | 12/2017 | Nakaniwa | ............. | F04D 29/444 |
| 2018/0266436 A1* | 9/2018 | Saito | .................... | F01D 25/24 |
| 2019/0331025 A1* | 10/2019 | Marrano | ................ | F02C 7/052 |
| 2020/0040819 A1* | 2/2020 | Walters | .................. | B64D 41/00 |
| 2023/0129366 A1 | 4/2023 | Meschino et al. | | |
| 2023/0175526 A1* | 6/2023 | Quercia | .............. | F04D 29/4213 |
| | | | | 415/116 |
| 2024/0043131 A1 | 2/2024 | Akcayoz | | |

FOREIGN PATENT DOCUMENTS

| | | | | |
|---|---|---|---|---|
| FR | 2636681 A1 * | 3/1990 | ......... | F04D 29/4213 |
| GB | 2165888 A * | 4/1986 | ........... | F04D 27/002 |
| WO | WO-9115664 A1 * | 10/1991 | ........... | F04D 29/444 |

* cited by examiner

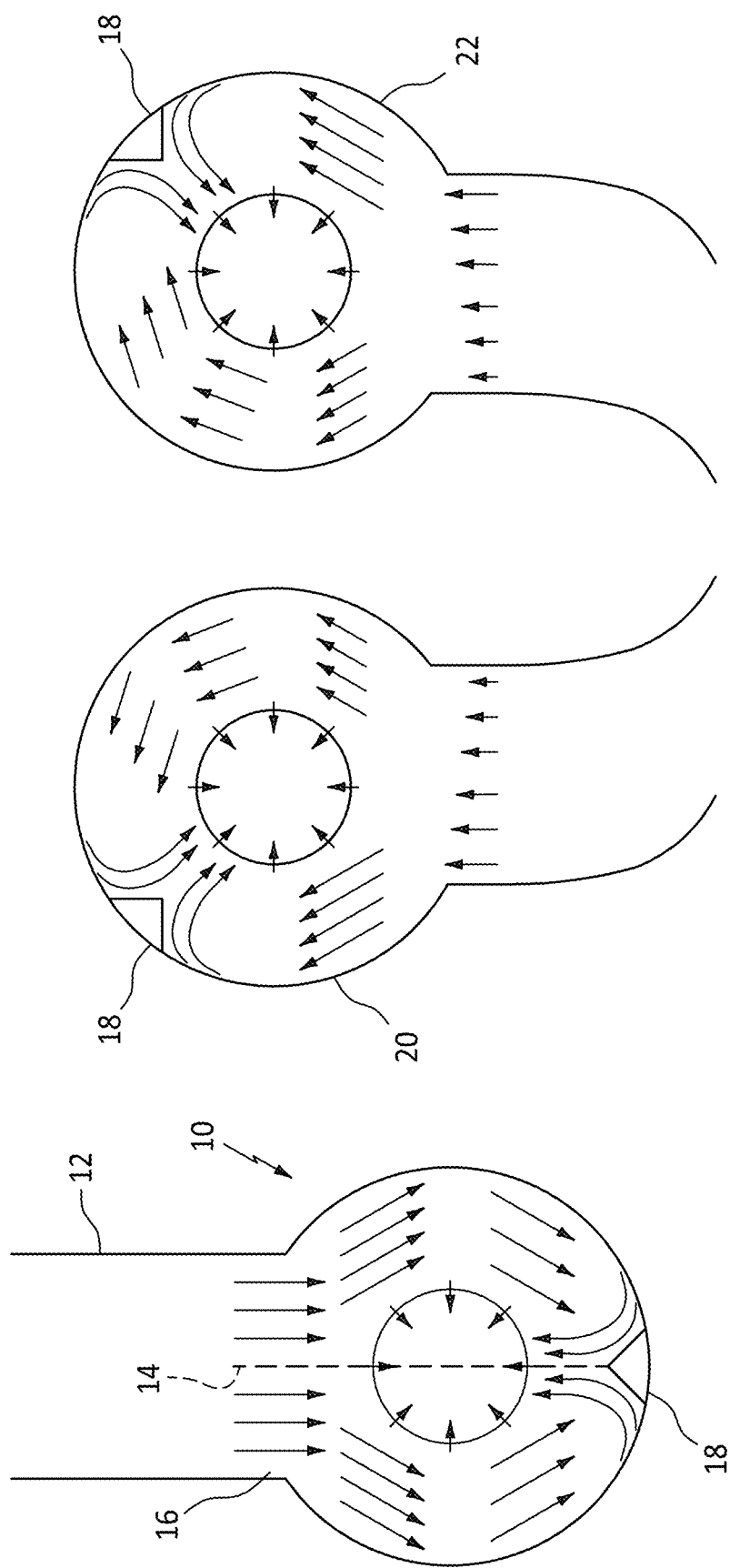

PLENUM CLOSURE PANEL WITH INTEGRATED AIRFLOW DIRECTION DEVICE

FIELD

The present disclosure relates to airflow entering a compressor, for example of a gas turbine engine.

BACKGROUND

Stability of airflow entering a compressor, or a plenum leading to the compressor, impacts proper operation of the compressor. Symmetrical flow entering the compressor is desirable, and flow control structures integrated into the plenum have been used to set the stagnation point of the flow and thereby avoid instabilities going into the compressor.

In some applications, however, the flow entering the plenum can be asymmetrical, for example due to the structure of the duct, location of the inlet and the like. In these cases, the flow control structure can be clocked toward the higher flow momentum side of the plenum to provide balance to the flow and set the stagnation point as desired to minimize instability. Implementing this clocking of the flow control structure results in the need for manufacture of numerous different structures of engine hardware.

SUMMARY OF THE DISCLOSURE

In one non-limiting embodiment, a plenum assembly for a compressor comprises a plenum housing defining a radially inward entry to a compressor and an outer circumference, and at least two open areas in the outer circumferences which are defined by at least two plenum flanges; an inlet duct connected to a first plenum flange of the at least two plenum flanges; and a panel having a flow control feature, wherein the panel is connected to a second plenum flange of the at least two plenum flanges.

In a non-limiting configuration, the panel has a flange configured to mate with and be secured to the at least two plenum flanges.

In a further non-limiting configuration, the panel further comprises an inner surface matching an inner surface of the plenum housing, and wherein the flow control feature extends inwardly from the inner surface of the panel.

In a still further non-limiting configuration, the flow control feature can be mounted at different locations along the inner surface of the panel.

In another non-limiting configuration, the inner surface of the panel is a segment of a circle having the same center and radius as the inner surface of the plenum housing.

In still another non-limiting configuration, the flange of the panel is configured to be mounted in each of the at least two plenum flanges in either circumferential direction.

In a further non-limiting configuration, the flow control feature comprises a ramp extending inwardly from the inner surface of the panel.

In a still further non-limiting configuration, the ramp is defined by two substantially planar surfaces extending inwardly from the inner surface of the panel and meeting at an innermost point of the flow control feature.

In another non-limiting configuration, the two substantially planar surfaces are arranged at the same angle with respect to the inner surface of the panel.

In still another non-limiting configuration, the two substantially planar surfaces are arranged at different angles with respect to the inner surface of the panel.

In a further non-limiting configuration, the assembly further comprises at least one panel blank without a flow control feature, whereby the panel blank, when mounted to a plenum flange, defines a flow surface along the plenum flange that matches the loft of the plenum housing.

In a still further non-limiting configuration, the plenum housing comprises at least three plenum flanges, and wherein the panel blank is mounted to a third plenum flange of the at least three flanges.

In another non-limiting configuration, the at least two plenum flanges are at locations around a circumference of the plenum housing such that center line radii drawn through center points of each of the at least two plenum flanges define an angle of between 90 and 180 degrees.

In still another non-limiting configuration, the angle is between 110 and 160 degrees.

In a further non-limiting configuration, the angle is 120 degrees.

In another non-limiting embodiment, a panel for a plenum housing comprises a substantially planar flange defining an inner space; a concave curved flow surface defined within the inner space; and a flow control feature extending from the concave curved flow surface.

In a non-limiting configuration, the concave curved flow surface has a first portion that extends to one side of the substantially planar flange and a second portion that extends to the other side of the substantially planar flange.

In another non-limiting configuration, the first portion is a central portion of the concave curved flow surface, and the second portion is at least one end of the central portion.

In still another non-limiting configuration, the flow control feature can be mounted at different locations along the concave curved flow surface.

In another non-limiting embodiment, a method for directing flow in a plenum housing of a compressor of a turbomachine comprises connecting an inlet duct to a first flange opening of a plenum housing, wherein the plenum housing has at least one second flange opening; and mounting a panel having a flow control feature in the second flange opening of the plenum housing whereby the flow control feature is positioned to interact with flow into the plenum housing through the inlet duct.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 1A-1C illustrate different configurations of inlet ducts and plenums for gas turbine engines.

DETAILED DESCRIPTION

Figure 4:
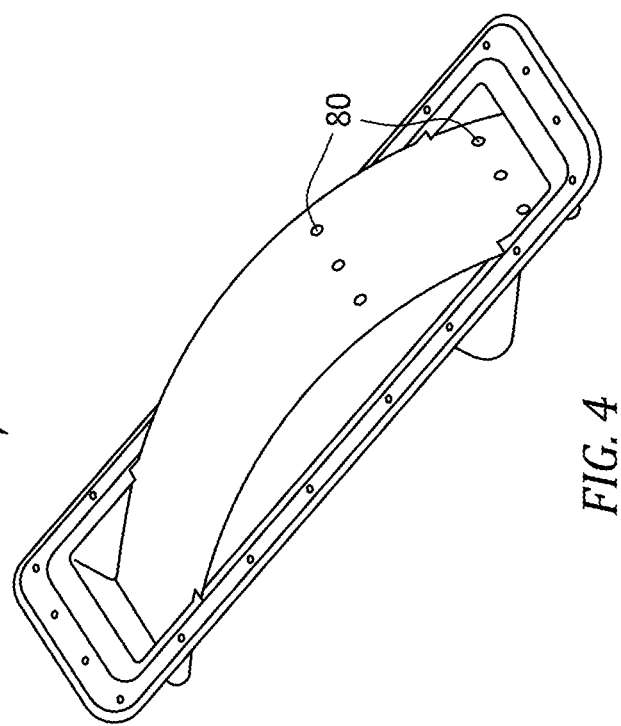
FIGS. 3 and 4 illustrate opposing views of an embodiment of a panel as disclosed herein.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a", "an", or "the" may include one or more than one and that reference to an item in the singular may also include the item in the plural. Further, all ranges may include upper and lower values and all ranges and ratio limits disclosed herein may be combined.

This disclosure relates to flow within a plenum to a compressor which can be a component of a turbomachine such as a gas turbine engine, turboshaft engine, auxiliary power unit or the like. In some configurations, the inlet to the compressor is a radial inlet, and stable fluid or air flow to the compressor is desired.

FIGS. 1A-1C schematically illustrate three different configurations of a plenum housing 10 wherein an inlet duct 12 is a straight configuration (FIG. 1A), the inlet duct 12 enters asymmetrically from a clockwise inducing side of the plenum housing (FIG. 1B) and the inlet duct 12 enters asymmetrically from a counter-clockwise inducing side of the plenum housing 10 (FIG. 1C). In each of these configurations, it is desired to provide symmetrical flow (through a plane 14 bisecting a plenum inlet flange 16 connected to the inlet duct 12. This leads to symmetrical flow inside the plenum and entering the compressor (schematically illustrated by the flow arrows entering the central area of the drawing in FIG. 1A.

In this type of plenum, there is a stagnation point generally opposite from inlet duct 12. As shown in FIG. 1A, a flow control feature in the form of a ramp structure 18 can be positioned within plenum 10 generally opposite from inlet duct 12, and this serves to mitigate the stagnation point and make the flow entering the compressor more uniform as desired. The stagnation point can be skewed to one side or the other when the inlet duct is configured to favor flow in one or the other directions such as in FIGS. 1B and 1C.

With the flow configuration of FIG. 1B, there is asymmetric flow in plenum 10 and flow is biased to the left side 20 of plenum 10. To maintain the desired uniform flow into the compressor, in this configuration the ramp structure 18 is positioned clockwise toward side 20 such that flow can be balanced and the effects of a stagnation point in a different location due to asymmetric flow from inlet duct 12 can be mitigated.

In the configuration of FIG. 1C, the opposite is the case, and flow is biased to the right side 22 of plenum 10. In this case, it is desired to position the ramp structure 18 counter-clockwise toward side 22 so as to mitigate the stagnation point that might otherwise form. These strategies are somewhat effective at maintaining uniform flow into the compressor, but they require different engine components for each case.

Figure 2:
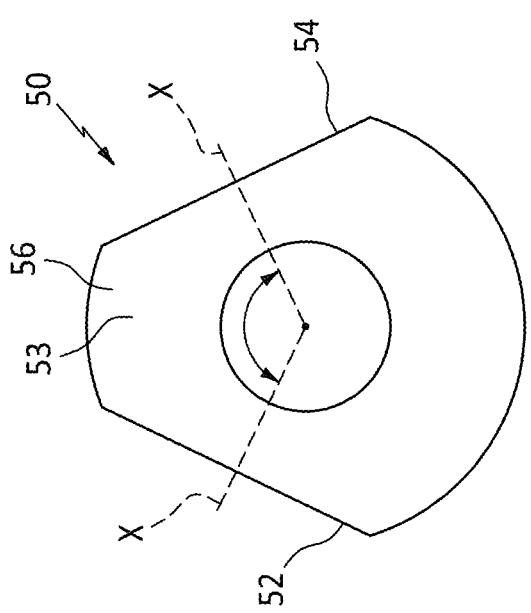
FIG. 2 illustrates a plenum housing according to one non-limiting disclosed embodiment.

FIG. 2 schematically illustrates a plenum housing 50 of one disclosed embodiment wherein plenum housing 50 has at least two, in this case two, plenum flanges 52, 54. Each flange 52, 54 is a flange structure to which other components can be mounted, wherein the flange structure encircles or defines an entry into an interior 56 of plenum housing 50. Each plenum flange 52, 54 can be a generally rectangular opening with a flat surface perimeter that can be used to secure other components to the flange. As will be further discussed below, these different flanges 52, 54 allow mounting of an inlet duct and a panel with flow control feature in a way that allows configuration to address stagnation for different flow configurations including but not limited to those illustrated in FIGS. 1A-1C, and all using the same engine components or hardware.

Still referring to FIG. 2, the position of flanges 52, 54 around the circumference of plenum housing 50 will be referred to as the circumferential position of same. In this regard, flanges 52, 54 can be positioned such that a center lines x drawn from a center of plenum housing 50 through a center point of each of flanges 52, 54 will define an angle 53 between them. This angle 53 can be between 90 and 180 degrees. In addition, within this broad range, angle 53 can in one non-limiting configuration be between 110 and 160 degrees, or further can be about 120 degrees, which is the case with respect to the embodiment shown in FIG. 2.

Figure 3:
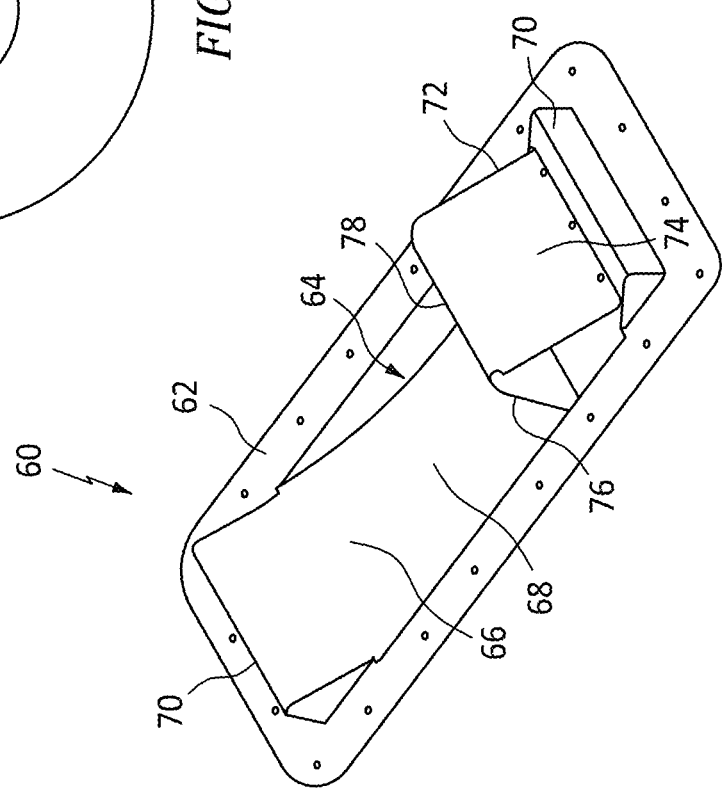

FIGS. 3 and 4 illustrate a panel 60 that can be secured to either flange 52, 54 of plenum 50 to position a flow control structure where desired within the plenum 50. Panel 60 has a generally rectangular flange 62 that defines an inner area 64, that is, an area substantially surrounded by flange 62. Within area 64 is a flow surface 66 which can be configured to match the curve or lift of the inner flow surface of plenum housing 50. As shown, flow surface 66 is a concave and radially curved flow surface, and can have a central portion 68 that extends in one direction beyond a plane of flange 62, and at least one, in this configuration two, end portions 70 that extend in the other direction beyond the plane of flange 62.

FIG. 4 shows the reverse or radially outer side of panel 60, and in this view it can be seen that flow surface 66 can be defined having an outer curved surface as well, for example defined by the single layer or construct of multiple layers that also define inner curved flow surface 66.

Returning to FIG. 3, a flow control feature 72 is positioned on flow surface 66 and extends radially inwardly, taken with respect to a radius of a plenum housing to which panel 60 is attached. Flow control feature 72 can have any of numerous shapes and contours designed to influence flow as desired. In the configuration shown in FIG. 3, flow control feature 72 is defined by two surfaces 74, 76. These surfaces can be defined at the same angle relative to flow surface 66 so as to produce a flow ramp as is schematically illustrated in the drawings. This configuration of flow control feature 72 serves to guide flow from each side along a similarly angled surface.

In another non-limiting configuration, it may be desired to have surfaces 74, 76 at different angles relative to flow surface 66. For example, one surface 74 can be defined at a shallow angle with respect to flow surface 66, and the other surface 76 can be at a different angle, for example substantially perpendicular to flow surface 66.

Surfaces 74, 76 meet at an apex or corner 78 which, when mounted to plenum housing 50, can be the radially innermost point of flow control feature 72. This configuration of flow control feature 72 will in some locations herein be referred to as a ramp. It is to be appreciated that flow control feature 72 can have other shapes as well, and can be triangular, and/or can be defined by curved rather than flat surfaces. Further, surface treatments can be deployed on flow control feature 72 such as but not limited to grooves, surface texture and the like.

Still referring to FIGS. 3 and 4, flow control feature 72 can be fixed in place on panel 60, or can be mounted to panel 60 at a multiple of different positions to make panel 60 further configurable to different flow situations. FIG. 4 shows connection points 80 to secure flow control feature 72, for example with mechanical fasteners or the like. Panels 60 can be modified on site with different connection points as needed to position flow control feature 72 where desired.

Figure 6:
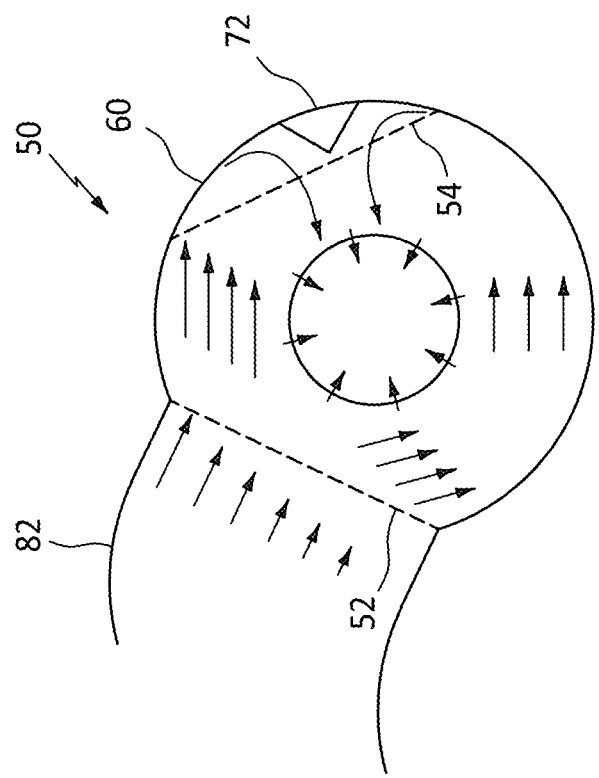
FIGS. 5 and 6 illustrate plenum assemblies using a panel and plenum housing as disclosed herein.
Figure 5:
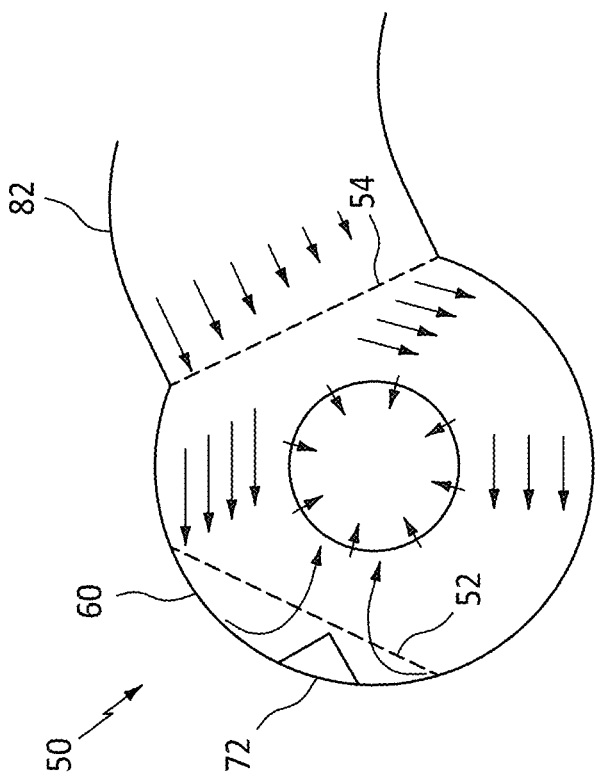

FIGS. 5 and 6 illustrate configurations where plenum housing 50 has two plenum flanges 52, 54. In FIG. 5, an inlet duct 82 is connected to plenum flange 54 with a right-hand curve, referred to as a right-hand inlet. With this configuration, a panel 60 can be mounted to plenum flange 52 as shown so as to position flow control feature 72 to influence flow as desired and avoid instability of the flow entering the compressor.

Alternatively, when a left-hand inlet is needed, inlet duct 82 can be mounted to plenum flange 52 and a panel 60 with flow control feature 72 can be mounted to plenum flange 54, all as shown.

For configurations such as that shown in FIG. 1A, flow control feature 72 can be moved on panel 60 such that when configured with an inlet duct in one plenum flange 52 and panel 60 mounted in the other plenum flange 54, flow control feature can be positioned as desired substantially directly opposite from the inlet duct.

Figure 8:
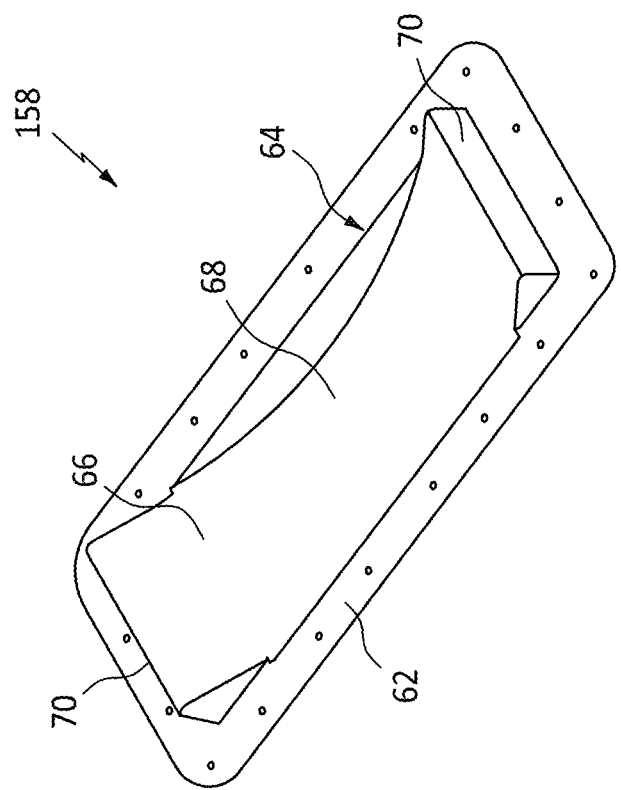
FIG. 8 illustrates a blank panel for use in some configurations.
Figure 7:
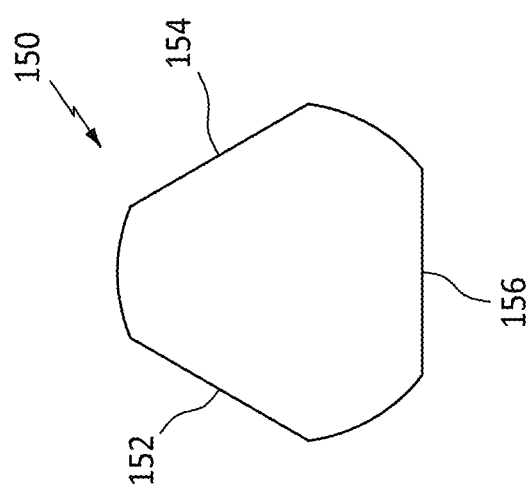
FIG. 7 illustrates another disclosed embodiment of a plenum housing having three flange openings.

It should be appreciated that plenum housings discussed above with respect to FIG. 2 have two plenum flanges. However, the plenum housing can be provided with more plenum flanges as desired. In this regard, FIG. 7 illustrates a plenum housing 150 having three (3) plenum flanges 152, 154, 156. With plenum housing 150, additional flexibility is provided for where an inlet duct 82 and panel 60 can be mounted. Further, in this configuration, multiple panels could be installed if useful to have two or more flow control features. Alternatively, a blank panel can be installed in whichever plenum flange 152, 154, 156 is not used for a plenum inlet 82 and a panel 60. FIG. 8 illustrates a suitable blank panel 158 which can have substantially the same structure as panel 60, but without a flow control feature.

Plenum housings and panels as disclosed herein can be manufactured using the same materials and manufacturing methods as are typically used in connection with known plenum housings such as those schematically illustrated in FIGS. 1A-1C (e.g., casting, forging, cutting, stamping, additive manufacturing, etc.). Panels and plenum housing as well can, for example, by made from composites, metal, metal alloy and any other material which would be suitable as known to persons of ordinary skill in the art.

It should be appreciated that plenum housings and panels as disclosed herein enable a method whereby flow in the plenum can be controlled, for example by determining an angle of approach for the inlet duct, positioning a plenum housing appropriately to connect with the inlet duct at one plenum flange, and then connecting a panel with flow control feature to the other plenum flange so as to position the flow control feature as desired, for example as shown in FIGS. 5 and 6. This method can be useful to implement the use of panels with flow control devices for compressors for many types of turbomachinery such as gas turbine engines, turboshaft engines, auxiliary power units or the like. In one non-limiting configuration, the method as well as the panel and assembly can be implemented with respect to an auxiliary power unit (APU) because the flow control structure is well suited to addressing issues in an area that is in close quarters, and sometimes difficult to access, as the APU can frequently be.

It should also be appreciated that the assembly disclosed herein allows numerous different configurations using the same modular assembly of components, thereby greatly simplifying manufacture of the plenum assembly, and allowing the same engine hardware to be used in multiple applications, for example to accommodate left and right entry inlet ducts.

It should also be appreciated that the plenum housing and panel assembly as disclosed herein has location of the flanges and of the flow control or ramp feature selected to minimize distortion. Distortion can be reduced, for example, by reducing the left to right momentum imbalance by promoting more uniform flow at the plenum entry flange and ultimately at compressor inlet, which reduces the angular momentum and the swirl angle at the compressor face.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

We claim:

1. A plenum assembly for a compressor, comprising:
   a plenum housing defining a radially inward entry to a compressor and an outer circumference, and at least two open areas in the outer circumferences which are defined by at least two plenum flanges;
   an inlet duct connected to a first plenum flange of the at least two plenum flanges; and
   a panel having a flow control feature, wherein the panel is connected to a second plenum flange of the at least two plenum flanges.

2. The assembly of claim 1, wherein the panel has a flange configured to mate with and be secured to the at least two plenum flanges.

3. The assembly of claim 2, wherein the panel further comprises an inner surface matching an inner surface of the plenum housing, and wherein the flow control feature extends inwardly from the inner surface of the panel.

4. The assembly of claim 3, wherein the flow control feature can be mounted at different locations along the inner surface of the panel.

5. The assembly of claim 3, wherein the inner surface of the panel is a segment of a circle having the same center and radius as the inner surface of the plenum housing.

6. The assembly of claim 2, wherein the flange of the panel is configured to be mounted in each of the at least two plenum flanges in either circumferential direction.

7. The assembly of claim 3, wherein the flow control feature comprises a ramp extending inwardly from the inner surface of the panel.

8. The assembly of claim 7, wherein the ramp is defined by two planar surfaces extending inwardly from the inner surface of the panel and meeting at an innermost point of the flow control feature.

9. The assembly of claim 8, wherein the two planar surfaces are arranged at the same angle with respect to the inner surface of the panel.

10. The assembly of claim 8, wherein the two planar surfaces are arranged at different angles with respect to the inner surface of the panel.

11. The assembly of claim 1, further comprising at least one panel blank without a flow control feature, whereby the at least one panel blank, when mounted to a plenum flange, defines a flow surface along the plenum flange that matches a loft of the plenum housing.

12. The assembly of claim 11, wherein the plenum housing comprises at least three plenum flanges, and wherein the at least one panel blank is mounted to a third plenum flange of the at least three flanges.

13. The assembly of claim 1, wherein the at least two plenum flanges are at locations around a circumference of the plenum housing such that center line radii drawn through center points of each of the at least two plenum flanges define an angle of between 90 and 180 degrees.

14. The assembly of claim 13, wherein the angle is between 110 and 160 degrees.

15. The assembly of claim 13, wherein the angle is 120 degrees.

* * * * *